(12) United States Patent
Feliste et al.

(10) Patent No.: US 10,976,210 B2
(45) Date of Patent: Apr. 13, 2021

(54) METHOD FOR ESTIMATING AN EXTERNAL FORCE ACTING ON AN ELECTROHYDROSTATIC ACTUATOR

(71) Applicant: Safran Electronics & Defense, Boulogne-Billancourt (FR)

(72) Inventors: Nirina Feliste, Boulogne-Billancourt (FR); Scott Delbecq, Boulogne-Billancourt (FR); Xavier Mery, Boulogne-Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 153 days.

(21) Appl. No.: 15/574,125

(22) PCT Filed: May 18, 2016

(86) PCT No.: PCT/EP2016/061117
§ 371 (c)(1),
(2) Date: Nov. 14, 2017

(87) PCT Pub. No.: WO2016/184898
PCT Pub. Date: Nov. 24, 2016

(65) Prior Publication Data
US 2018/0292278 A1 Oct. 11, 2018

(30) Foreign Application Priority Data
May 18, 2015 (FR) ...................... 1554437

(51) Int. Cl.
*G01L 5/00* (2006.01)
*F15B 19/00* (2006.01)
(Continued)

(52) U.S. Cl.
CPC .......... *G01L 5/0061* (2013.01); *B64C 13/504* (2018.01); *F15B 11/028* (2013.01);
(Continued)

(58) Field of Classification Search
None
See application file for complete search history.

(56) References Cited

U.S. PATENT DOCUMENTS

2015/0224845 A1* 8/2015 Anderson ............ B60G 17/019
701/37

FOREIGN PATENT DOCUMENTS

DE 102006052810 A1 5/2008
DE 102010007042 A1 8/2011
(Continued)

OTHER PUBLICATIONS

Ramesh Perla et al., "State estimation in electro-hydraulic actuator using proportional integral observer," 2004, Proceedings of the IEEE INDICON 2004, First India Annual Conference, pp. 233-236 (Year: 2004).*

(Continued)

*Primary Examiner* — Kamini S Shah
*Assistant Examiner* — Russ Guill
(74) *Attorney, Agent, or Firm* — Womble Bond Dickinson (US) LLP (57) ABSTRACT

The invention concerns a method for estimating an external force acting on an electrohydrostatic actuator, the actuator comprising a ram including a first chamber, a second chamber and a piston located between the first chamber and the second chamber, a pump capable of injecting fluid into the chambers for controlling a movement of the piston, and an electric motor driving the pump, the method comprising steps of: estimating, by means of at least one state observer (21, 22), a dynamic component and a static component of a difference in equivalent fluid pressure between the first chamber and the second chamber from a rotational speed of the electric motor, a position of the piston and a supply current of the electric motor, estimating the external force by (Continued)

means of a post-processing module (23) as a combination of the estimated dynamic component and static component of the difference in fluid pressure.

11 Claims, 3 Drawing Sheets

(51) Int. Cl.
*G01L 13/00* (2006.01)
*G01L 1/02* (2006.01)
*B64C 13/50* (2006.01)
*G01L 1/08* (2006.01)
*F15B 11/028* (2006.01)
*G01L 15/00* (2006.01)
*F15B 11/036* (2006.01)

(52) U.S. Cl.
CPC .......... *F15B 11/036* (2013.01); *F15B 19/007* (2013.01); *G01L 1/02* (2013.01); *G01L 1/083* (2013.01); *G01L 13/00* (2013.01); *G01L 15/00* (2013.01); *F15B 2211/20515* (2013.01); *F15B 2211/20561* (2013.01); *F15B 2211/27* (2013.01); *F15B 2211/633* (2013.01); *F15B 2211/6336* (2013.01); *F15B 2211/6651* (2013.01); *F15B 2211/7053* (2013.01); *F15B 2211/7054* (2013.01); *F15B 2211/761* (2013.01)

(56) References Cited

FOREIGN PATENT DOCUMENTS

| | | |
|---|---|---|
| EP | 1882534 A1 | 1/2008 |
| JP | 10-169602 A | 6/1998 |

OTHER PUBLICATIONS

F. Conrad et al., "Design of hydraulic force control systems with state estimate feedback," 1987, IFAC 10th Triennial World Congress, pp. 307-312 (Year: 1987).*

Hong Sun et al., "Nonlinear observer based force control of electro-hydraulic actuators," 1999, Proceedings of the American Control Conference, pp. 764-768 (Year: 1999).*

Preliminary Research Report received for French Application No. 1554437, dated Apr. 14, 2016, 2 pages (1 page of French Translation Cover Sheet and 1 page of original document).

Philippe de Larminat, "Observateurs LTI", Chapitre 8.3, 2ème Édition, Hermès Science Publications, pp. 209 and 213.

International Search Report and Written Opinion received for PCT Patent Application No. PCT/EP2016/061117, dated Sep. 12, 2016, 18 pages (9 pages of English Translation and 9 pages of original Document).

International Preliminary Report on Patentability received for PCT Patent Application No. PCT/EP2016/061117, dated Nov. 30, 2017, 16 pages (9 pages of English Translation and 7 pages of original Document).

* cited by examiner

METHOD FOR ESTIMATING AN EXTERNAL FORCE ACTING ON AN ELECTROHYDROSTATIC ACTUATOR

FIELD OF THE INVENTION

The invention relates to a method for estimating an external force acting on an electrohydrostatic actuator, as well as a control unit programmed to implement such a method.

PRIOR ART

In aircraft, the control surfaces allow the air flow surrounding the surface of the aircraft to be modified, so as to control the orientation of the aircraft in space.

In an airplane, the flight control surfaces include for example primary flight control surfaces which are actuated in the flight phase, and secondary flight control surfaces (leading edge slats, high-lift flaps) which are actuated only during certain low-speed phases, particularly phases of takeoff and landing.

Among the primary flight control surfaces, the ailerons located at the ends of the airplane's wings allow the rolling motion of the airplane to be controlled.

These control surfaces are mounted pivotally with respect to the structure of the airplane's wing, and each control surface is actuated mechanically by one or more actuator(s) housed in the wing of the airplane.

In certain airplanes, the actuators used to actuate the control surfaces are electrohydrostatic actuators or EHA. These actuators generally comprise an electric motor, a dedicated pump and a ram, as well as an autonomous fluid reserve. The hydraulic motor drives the pump which injects fluid into the chambers of the ram to displace a piston.

This type of actuator is controlled by an electrical control signal generated by an electronic control unit. The electrical control signal allows the rotation speed of the motor to be adjusted.

In operation, the ram is subjected to external forces generated in particular by the aerodynamic forces acting on an aerodynamic surface. The rotation speed of the electric motor must consequently be adjusted in real time so as to allow the ram to generate a reaction force opposing the external forces to which the ram is subjected, so as to maintain the control surface in a set position.

However, in order to avoid damage to the structure of the airplane and/or to the control surface, it may be necessary to limit the reaction force generated by the ram. The reaction force generated by the ram must not exceed a predetermined limit value generally defined by the aircraft manufacturers.

A known solution for limiting the reaction force consists of correcting the electrical control signal received by the electric motor, when a pressure difference detected in the chambers of the ram (this pressure difference being substantially representative of the reaction force generated by the ram) approaches a predetermined threshold value. The electric motor is thus controlled so that the pressure difference in the chambers of the ram remains below this threshold value.

In order to accomplish such a correction, it is necessary to measure the pressure in the chambers of the ram by means of pressure sensors. It would also be practicable to measure the external force acting on the ram by means of a force sensor. However, in both cases, it is necessary to provide for specific sensors, which increases the bulk and the mass of the actuator and involves the use of additional electronic equipment for processing the measurement signals provided by these sensors.

SUMMARY OF THE INVENTION

One aim of the invention is to propose a solution for determining an external force acting on an electrohydrostatic actuator, without having recourse to sensors measuring the pressure difference in the chambers of the ram or the external force.

This aim is achieved according to the present invention thanks to a method for estimating an external force acting on an electrohydrostatic actuator, the actuator comprising a ram including a first chamber, a second chamber and a piston situated between the first chamber and the second chamber, a pump capable of injecting fluid into the chambers for controlling a movement of the piston, and an electric motor driving the pump, the external force being an axial force acting on the ram, the method comprising steps of:
estimating, by means of at least one state observer, a dynamic component and a static component of an equivalent fluid pressure difference between the first chamber and the second chamber from a rotation speed of the electric motor, a position of the piston and a supply current of the electric motor,
estimating the external force by means of a post-processing module as a combination of the dynamic component and of the static component of the estimated fluid pressure difference.

The proposed method is based on the estimation, on the one hand, of the dynamic component of the equivalent pressure difference, and on the other hand, of the static component of the equivalent pressure difference.

The two components of the pressure difference are estimated separately from the rotation speed of the electric motor, the position of the piston and the supply current of the electric motor, these three variables being generally already available for servo-control of the position of the actuator, which avoids the use of additional pressure or force sensors. (Such sensors could however be used to provide consolidation of the measurements, if necessary.)

The exterior force acting on the actuator is then simply reconstituted by combining the two components provided by the state observer.

According to a possible embodiment of the invention, the method comprises steps of:
estimating, by means of a first state observer, the dynamic component of the equivalent fluid pressure difference between the first chamber and the second chamber, and a movement speed of the piston, from a rotation speed of the electric motor and a position of the piston, and
estimating, by means of a second state observer, the static component of the equivalent fluid pressure difference between the first chamber and the second chamber, from the movement speed of the piston estimated by the first observer, from the rotation speed of the electric motor and from the supply current of the electric motor.

The use of two state observers in cascade allows successively estimating the dynamic component of the equivalent pressure difference and the static component of the equivalent pressure difference, which allows releasing with the difficulties of estimating the equivalent pressure difference from a single state observer.

The proposed method may further have the following features:
- the first observer uses the rotation speed of the electric motor as an input and the position of the piston as a measured output,
- the second observer uses the rotation speed of the electric motor and the supply current of the electric motor as inputs, and a variable combining the movement speed of the piston and the rotation speed of the electric motor as a measured output,
- the dynamic component of the equivalent fluid pressure difference is estimated by the first observer from a first mathematical model of the actuator in which the external force acting on the actuator is zero,
- the first mathematical model is in the form:

$$\begin{pmatrix} \dot{x}_{obs} \\ \dot{v}_{obs} \\ \Delta \dot{P}_{dyn\_obs} \end{pmatrix} = \begin{pmatrix} 0 & 1 & 0 \\ 0 & 0 & \mu \\ 0 & -\gamma & 0 \end{pmatrix} \cdot \begin{pmatrix} x_{obs} \\ v_{obs} \\ \Delta P_{dyn\_obs} \end{pmatrix} + \begin{pmatrix} 0 \\ 0 \\ \lambda \end{pmatrix} \cdot \Omega_{motor} + \begin{pmatrix} k_{11} \\ k_{12} \\ k_{13} \end{pmatrix} \cdot (x_{mes} - x_{obs})$$

where $x_{obs}$ is the estimated position of the piston, $v_{obs}$ is the estimated speed of the piston, $\Delta P_{dyn\_obs}$ is the dynamic component of the estimated equivalent pressure difference, $\Omega_{motor}$ is the rotation speed of the electric motor, $x_{mes}$ is the measured position of the piston, $\gamma$, $\mu$, $\lambda$ are constant parameters of the model and $k_{11}$, $k_{12}$, $k_{13}$ are gains of the first observer adjusting the dynamics and the stability of the first observer,
- the second static component of fluid pressure is estimated by the second observer from a second mathematical model of the actuator, in which the static component of the equivalent pressure difference of the fluid is considered to be proportional to the external force,
- the second mathematical model is in the form:

$$\begin{pmatrix} \dot{X}_{1\_obs} \\ \Delta \dot{P}_{stat\_obs} \end{pmatrix} = \begin{pmatrix} 0 & 1 \\ 0 & 0 \end{pmatrix} \cdot \begin{pmatrix} X_{1\_obs} \\ \Delta P_{stat\_obs} \end{pmatrix} + \begin{pmatrix} \alpha \\ 0 \end{pmatrix} \cdot \Omega_{motor} + \begin{pmatrix} \beta \\ 0 \end{pmatrix} \cdot I_{motor} + \begin{pmatrix} k_{21} \\ k_{22} \end{pmatrix} \cdot (X_{1\_mes} - X_{1\_obs})$$

where $X_1$ is a state variable defined as $$X_1 = \frac{1}{\mu} \cdot \dot{x} + \varepsilon \cdot \Omega_{motor},$$

and wherein $X_{1\_obs}$ is the estimated state variable $X_1$, $\Delta P_{stat\_obs}$ is the static component of the estimated equivalent pressure difference, $X_{1\_mes}$ is the measured state variable $X_1$, $\Omega_{motor}$ is the rotation speed of the electric motor, $I_{motor}$ is the supply current of the electric motor, $\alpha$, $\beta$, $\mu$ and $\varepsilon$ are constant parameters of the model and $k_{21}$ and $k_{22}$ are gains of the second observer adjusting the dynamics and the stability of the second observer,
- the observer is an observer of the deterministic or stochastic type,
- the actuator is a flight control surface actuator of an aircraft.

The invention also applies to a method for controlling an electrohydrostatic actuator, the actuator comprising a ram including a first chamber, a second chamber and a piston situated between the first chamber and the second chamber, a pump capable of injecting fluid into the chambers for controlling a movement of the piston, an electric motor driving the pump, by means of a control unit executing steps according to which:
- the control unit generates a control signal to control the electric motor,
- the control unit estimates the external force acting on the electrohydrostatic actuator according to an estimation method as defined previously,
- the control unit determines a correction variable of the control signal depending on the estimated external force, and
- the control unit applies the correction variable to the control signal, so as to limit the fluid pressure in the chambers of the ram.

The invention also relates to a control unit for controlling an electrohydrostatic actuator, the actuator comprising a ram including a first chamber, a second chamber and a piston situated between the first chamber and the second chamber, a pump capable of injecting fluid into the chambers to control a movement of the piston and an electric motor driving the pump, the control unit being configured to generate a control signal to control the electric motor, estimating the external force acting on the electrohydrostatic actuator according to an estimation method as previously defined, determining a correction variable for the control signal depending on the estimated external force and applying the correction variable to the control signal, so as to limit the fluid pressure in the chambers of the ram.

The invention also relates to an electrohydrostatic actuator and associated control unit, the control unit being according to the preceding definition.

PRESENTATION OF THE DRAWINGS

Other features and advantages will still be revealed by the description that follows, which is purely illustrative and not limiting, and must be read with reference to the appended figures, among which.

DETAILED DESCRIPTION OF AN EMBODIMENT

Figure 1:
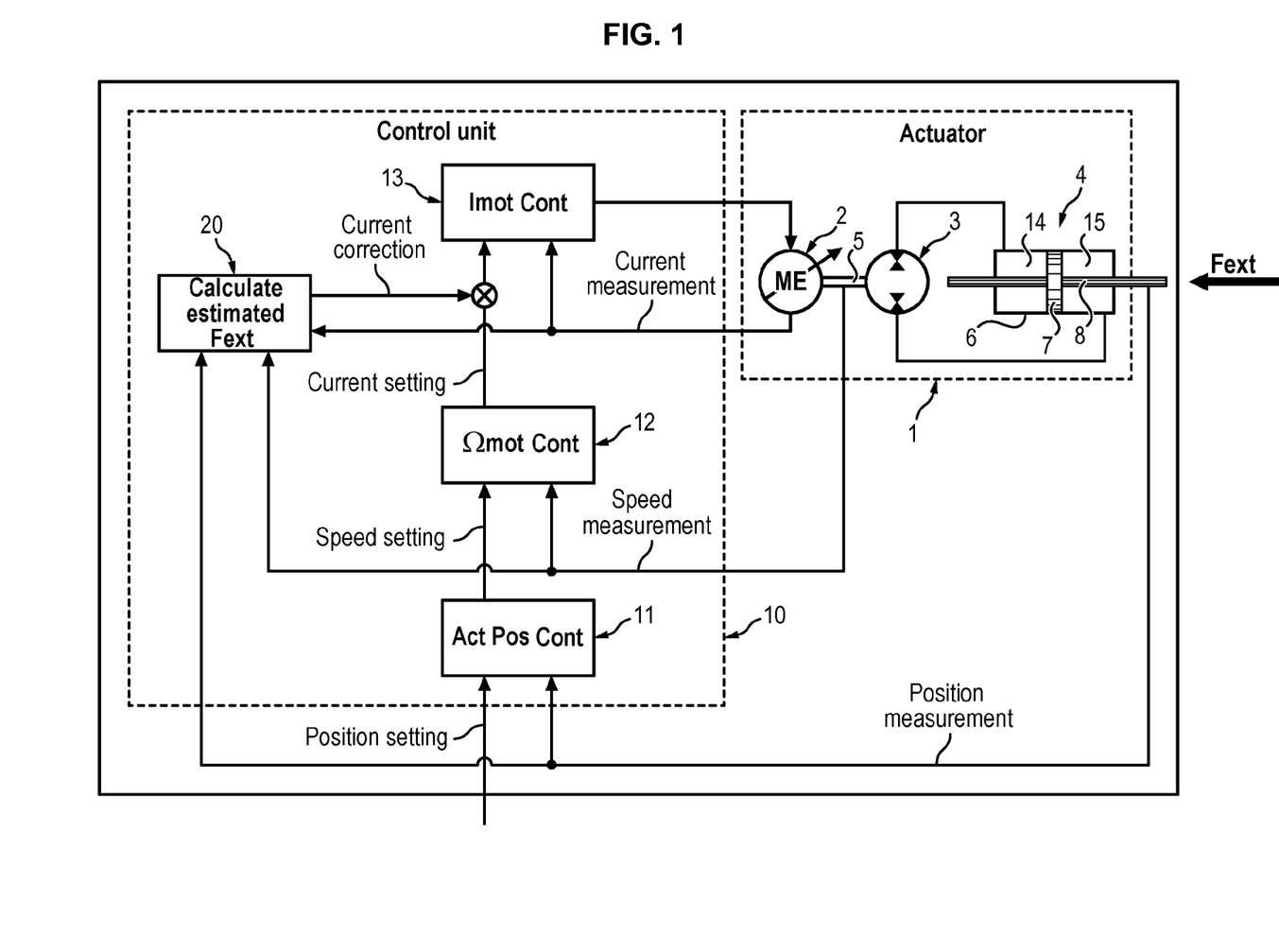
FIG. 1 shows schematically an electrohydrostatic actuator and a control unit conforming to an embodiment of the invention.

In FIG. 1, the electrohydrostatic actuator 1 shown comprises an electric motor 2, a hydraulic pump 3 and a ram 4.

The electric motor 2 is for example a synchronous, permanent magnet motor. The electric motor 2 is controlled by a control signal allowing the intensity of the supply current circulating in the motor 2 to be adjusted. In the case of a permanent magnet synchronous motor, the supply current is a sinusoidal three-phase current.

The hydraulic pump 3 is for example a fixed displacement pump. The pump 3 is connected to the rotor of the electric motor 2 by a pump shaft 5, the pump shaft 5 being driven in rotation by the electric motor 2.

The ram 4 comprises a cylinder 6, a piston 7 capable of being displaced axially inside the cylinder, and a piston rod 8 mounted fixed to the piston. The cylinder 6 and the piston rod 7 are intended for example to be connected respectively to a structure of an aircraft and to a flight control surface of the aircraft to displace the flight control surface with respect to the structure of the aircraft.

The piston 7 delimits inside the cylinder 6 a first chamber 14 and a second chamber 15, the two chambers extending inside the cylinder 6, on either side of the piston 7.

When the pump 3 is driven in rotation by the electric motor 2, the pump 3 injects fluid inside the first chamber 14 and/or the second chamber 15, so as to displace the piston 7 inside the cylinder 6, and thus to adjust the position of the control surface with respect to the structure of the wing.

The fluid contained in the first chamber 14 is at a first pressure $P_1$ and the fluid contained in the second chamber 15 is at a second pressure $P_2$.

The difference in pressure between the two chambers 14 and 15 is defined as a linear combination of the first pressure $P_1$ and the second pressure $P_2$.

In the case of a symmetric ram, the pressure difference $\Delta P$ is defined as the difference between the first pressure $P_1$ and the second pressure $P_2$:

$$\Delta P = P_1 - P_2$$

In the case of an asymmetric ram, the pressure difference considered is an equivalent pressure difference, $\Delta P_{eq}$, calculated as follows:

$$\Delta P_{eq} = P_1 - \frac{S_2}{S_1} P_2$$

where $S_1$ is the cross-section of the ram on the side of the first chamber 14 and $S_2$ is the cross-section of the ram on the side of the second chamber 15.

Moreover, as illustrated in FIG. 1, the electrohydrostatic actuator 1 is subjected to an external force. More precisely, the rod 8 of the ram 4 is subjected to an external force $F_{ext}$. This external force is generated in particular by the aerodynamic forces acting on the flight control surface. The external force $F_{ext}$ is an axial force, i.e. a force the direction whereof is parallel to the moving direction of the piston 7 with respect to the cylinder 6.

The electric motor 2 is controlled by a control unit 10.

The control unit 10 is capable of receiving as an input a position setting signal, a position measurement signal, an electric motor rotation speed measurement signal (or rotation of the pump shaft) and an electrical supply current measurement signal of the electric motor, and to generate as an output a voltage control signal for controlling the electric motor 2.

The position setting signal received by the control unit 10 is representative of a desired position of the rod (or the piston), this position being for example determined by the pilot of the aircraft.

The position measurement signal received by the control unit 10 is representative of a measured position of the rod (or of the piston). The position measurement signal is generated by a position sensor integrated into the ram 4, such as a Hall-effect sensor for example.

The electric motor rotation speed measurement signal received by the control unit 10 is representative of a rotation speed of the electric motor (or of the pump shaft 5). The rotation speed measurement signal is generated by a speed sensor associated with the pump shaft 5 or the rotor of the electric motor 2, such as an incremental coder for example.

The electrical current measurement signal received by the control unit 10 is representative of an intensity of the electrical current supplying the stator of the electric motor. In the case of a synchronous, permanent magnet motor, the current is three-phase current and the intensity of the current is the effective value of the intensity of one of the phases of the current.

The control unit 10 comprises a first control module 11, a second control module 12, a third control module 13 and a fourth control module 20. The modules 11 to 13 and 20 may be physical modules connected to one another by appropriate communication means. The modules 11 to 13 and 20 may alternatively be computer program instruction blocks suitable for interacting with one another when they are executed by a processor. These modules may then form together a computer program executable by at least one processor.

The first control module 11 is capable of generating a speed setting signal depending on the position setting signal and the position measurement signal.

The second control module 12 is capable of generating a current setting signal depending on the speed setting signal and the speed measurement signal.

The third control module 13 is capable of generating the voltage signal to control the electric motor depending on the current signal and the current measurement signal.

The fourth control module 20 is capable of generating a correction signal, to correct the current setting signal depending on the position measurement signal, the speed measurement signal and the current measurement signal.

The correction signal is applied to the current setting signal by a multiplier.

The application of the correction signal makes it possible to limit the fluid pressure difference between the chambers 14 and 15 of the ram 4, when the external force $F_{ext}$ acting on the electrohydrostatic actuator 1 becomes too high.

Figure 2:
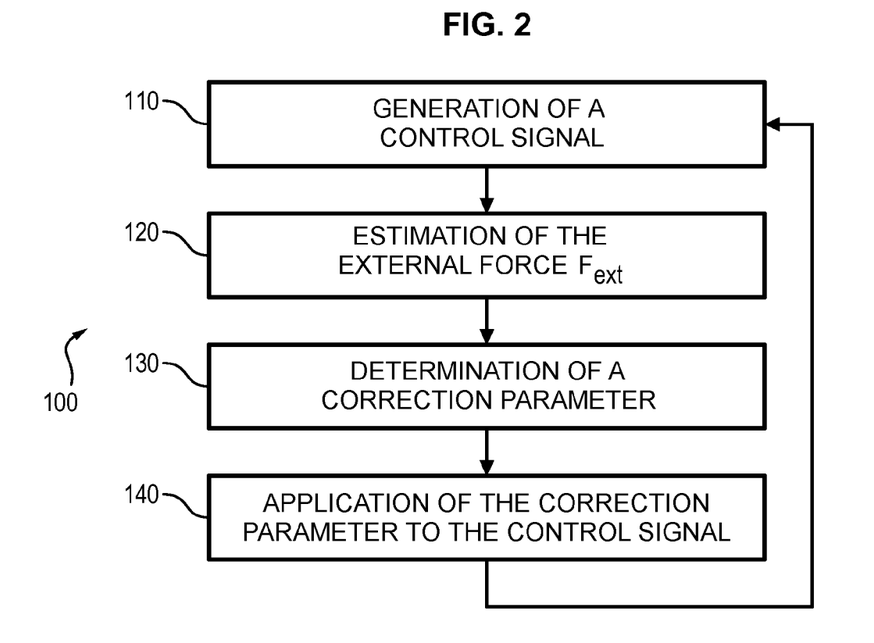
FIG. 2 shows schematically steps of a method for controlling the electrohydrostatic actuator implemented by the control unit.

FIG. 2 shows schematically steps of a method 100 for controlling the electrohydrostatic actuator, the method 100 being implemented by the control unit 10.

According to a first step 110, the control module 13 generates the control signal to control the electric motor 2.

According to a second step 120, the control module 20 estimates the external force $F_{ext}$ acting on the electrohydrostatic actuator 1 depending on the rotation speed of the electric motor $\Omega_{motor}$, a position of the piston x and a supply current $I_{motor}$ of the electric motor, the rotation speed of the electric motor, the position of the piston and the supply current of the motor being measured by sensors.

According to a third step 130, depending on the value of the force $F_{ext}$ estimated at the second step, the control module 20 determines a correction variable of the control signal. In particular, the correction variable may be such that if the external force is less than a threshold value, the correction variable is equal to 1, if the external force is comprised between a first threshold value and a second threshold value, the correction variable decreases linearly between 0 and 1, and if the external force is greater than the second threshold value, the correction variable is equal to 0.

According to a fourth step 140, the control module 20 applies the correction variable to the control signal, so as to limit the pressure difference of the fluid between the chambers 14 and 15 of the ram, and thus the reaction force generated by the electrohydrostatic actuator.

Figure 3:
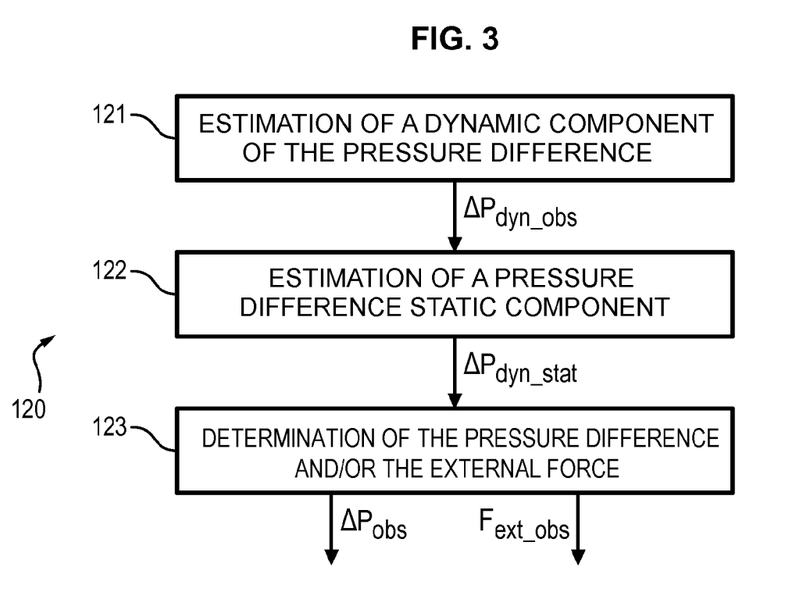
FIG. 3 shows schematically steps of a method for estimating an external force acting on the electrohydrostatic actuator.
Figure 4:
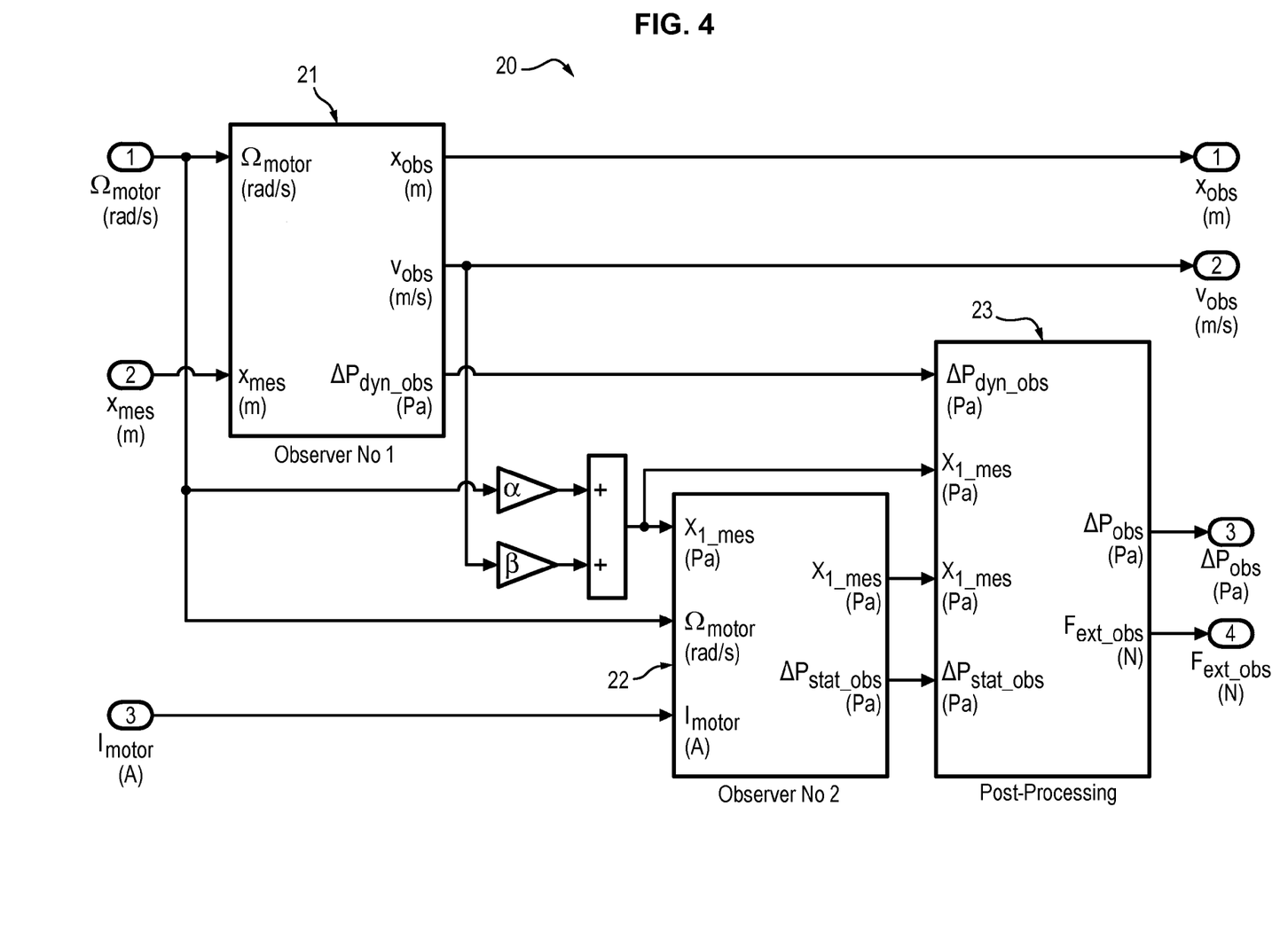
FIG. 4 is a diagram showing schematically the estimation method of FIG. 3.

FIGS. 3 and 4 show schematically a method for estimating the external force $F_{ext}$ accomplished by the control module 20 during the second step 120.

The method for estimating the external force $F_{ext}$ implements a first state observer 21, a second state observer 22 and a post-processing module 23.

The state observers 21 and 22 and the post-processing module 23 may be physical modules connected to one another by appropriate communication means or computer program instruction blocks suitable for interacting with one another when they are executed by a processor. The state observers 21, 22 and the post-processing module 23 may then form together a computer program executable by at least one processor.

Regarding the state observers, it is possible to refer to the book "Automatique appliquée" [applied automation], by Philippe de Larminat, $2^{nd}$ edition, 2009, Hermes Science Publications, chapter 8.3—Observateurs LTI [LTI observers], pages 209 and subsequent.

Recall that a state observer allows reconstruction of a non-measurable state of a system from a mathematical model of the system and measurement of other quantities. Assuming for example a system having one input U, a (measured) output Y and a (non-measured) state X which it is intended to estimate.

A dynamic state observer is in the form:

$$\dot{X}_{obs}=AX_{obs}+BU+L(Y_{mes}-Y_{obs})$$

$$Y_{obs}=CX_{obs}$$

where $Y_{mes}$ is the measurement of the output Y, $Y_{obs}$ is the estimate of the output Y by the observer, A, B, C are matrices of parameters of the mathematical model of the system and L is a gain matrix selected so that the error in the state $(X_{obs}-X)$ converges to 0.

The observer may be written as follows:

$$\dot{X}_{obs}=(A-LC)X_{obs}+BU+LY_{mes}$$

The state observers 21 and 22 may be observers of the deterministic or the stochastic type. An example of a deterministic type state observer is a Luenberger observer. An example of the stochastic type state observer is a Kalman observer.

According to a first step 121, the control module 20 estimates, by means of the first state observer 21, a dynamic component $\Delta P_{dyn}$ of a fluid pressure difference between the chambers 14 and 15 of the ram 4 and a movement speed v of the piston 7, from the measured rotation speed $\Omega_{motor}$ of the electric motor and on the measured position x of the piston 7.

The first observer 21 uses the rotation speed of the electric motor $\Omega_{motor}$ as an input of the system and the position x of the piston as an output.

The dynamic component of the fluid pressure difference $\Delta P_{dyn}$ is estimated by the first observer 21 from a first mathematical model.

Insofar as only the dynamic component $\Delta P_{dyn}$ of the pressure difference is estimated at this step, the first mathematical model is based on the assumption that the external force $F_{ext}$ acting on the actuator is zero.

The first deterministic mathematical model is thus in the form:

$$\begin{pmatrix} \dot{x}_{obs} \\ \dot{v}_{obs} \\ \Delta \dot{P}_{dyn\_obs} \end{pmatrix} = \begin{pmatrix} 0 & 1 & 0 \\ 0 & 0 & \mu \\ 0 & -\gamma & 0 \end{pmatrix} \cdot \begin{pmatrix} x_{obs} \\ v_{obs} \\ \Delta P_{dyn\_obs} \end{pmatrix} + \begin{pmatrix} 0 \\ 0 \\ \lambda \end{pmatrix} \cdot \Omega_{motor} + \begin{pmatrix} k_{11} \\ k_{12} \\ k_{13} \end{pmatrix} \cdot (x_{mes}-x_{obs})$$

where $x_{obs}$ is the estimated position of the piston, $v_{obs}$ is the estimated speed of the piston, $\Delta P_{dyn\_obs}$ is the dynamic component of the estimated pressure difference, $\Omega_{motor}$ is the rotation speed of the electric motor, $x_{mes}$ is the measured position of the piston, $\gamma$, $\mu$, $\lambda$ are constant parameters of the model and $k_{11}$, $k_{12}$, $k_{13}$ are gains of the first observer.

The parameters $\gamma$, $\mu$, $\lambda$ may for example be obtained by means of parametric identification techniques from actual tests on the actuator.

The gains $k_{11}$, $k_{12}$, $k_{13}$ are obtained by pole placement techniques in the case of a deterministic model or by constraint function optimization techniques in the case of a stochastic model.

The first mathematical model may be augmented to take into account additional variables, such as pump leakage for example.

This first step 121 leads to obtaining an estimated value $\Delta P_{dyn\_obs}$ of the dynamic component of the pressure difference between the two chambers 14 and 15 of the ram.

According to a second step 122, the control module 20 estimates, by means of a second state observer 22, a static component of the fluid pressure difference between the two chambers 14 and 15, from the movement speed of the piston v previously estimated by the first observer, the rotation speed $\Omega_{motor}$ of the electric motor and a supply current $I_{motor}$ of the electric motor.

The second observer 22 uses the rotation speed of the electric motor $\Omega_{motor}$ and the supply current of the electric motor $I_{motor}$ as input variables, and a state variable $X_1$ combining the movement speed of the piston v and the rotation speed of the motor $\Omega_{motor}$ as a measured variable.

The static component $\Delta P_{stat}$ of the fluid pressure difference is estimated by the second observer 22 from a second mathematical model of the actuator.

Insofar as only the static component $\Delta P_{stat}$ of the pressure difference is estimated at this step, the second mathematical model is based on the assumption that the external force $F_{ext}$ acting on the electrohydrostatic actuator varies slowly and may therefore be considered as a constant force. In quasi-statics (with small accelerations of the piston), the fluid pressure difference between the chambers 14 and 15 of the ram is proportional to the external force $F_{ext}$.

The second deterministic mathematical model is thus in the form:

$$\begin{pmatrix} \dot{X}_{1\_obs} \\ \Delta \dot{P}_{stat\_obs} \end{pmatrix} = \begin{pmatrix} 0 & 1 \\ 0 & 0 \end{pmatrix} \cdot \begin{pmatrix} X_{1\_obs} \\ \Delta P_{stat\_obs} \end{pmatrix} + \begin{pmatrix} \alpha \\ 0 \end{pmatrix} \cdot \Omega_{motor} + \begin{pmatrix} \beta \\ 0 \end{pmatrix} \cdot I_{motor} + \begin{pmatrix} k_{21} \\ k_{22} \end{pmatrix} \cdot (X_{1\_mes}-X_{1\_obs})$$

with $X_1 = \frac{1}{\mu} \cdot \dot{x} + \varepsilon \cdot \Omega_{motor}$, where $X_{1\_obs}$ is the estimated state variable $X_1$, $\Delta P_{stat\_obs}$ is the static component of the estimated pressure difference, $X_{1\_mes}$ is the measured state variable $X_1$, $\Omega_{motor}$ is the rotation speed of the electric motor, $I_{motor}$ is the supply current of the electric motor, α, β, μ and ε are constant parameters of the model and $k_{21}$ and $k_{22}$ are gains of the second observer.

The parameters α, β, μ and ε may for example be obtained by means of parametric identification techniques from actual tests of the actuator.

The gains $k_{21}$ and $k_{22}$ are obtained by pole placement techniques in the case of a deterministic model or by constraint function optimization techniques in the case of a stochastic model.

The second mathematical model may also be augmented to take into account additional variables, such as pump leakage for example.

According to a third step 123, the control module 20 determines, by means of the post-processing module 23, an estimated pressure difference $\Delta P_{obs}$ between the chambers of the actuator. The estimated pressure difference $\Delta P_{obs}$ is determined as the sum of the dynamic component estimated by the first observer and the static component estimated by the second observer:

$$\Delta P_{obs} = \Delta P_{dyn\_obs} + \Delta P_{stat\_obs}$$

The control module 20 also determines the estimated external force $F_{ext\_obs}$ acting on the actuator, from the estimated pressure difference.

In the case of a symmetric ram, the external force is determined as follows:

$$F_{ext\_obs} = \Delta P_{obs} \times S_{ram}$$

where $F_{ext\_obs}$ the estimated external force, $\Delta P_{obs}$ is the estimated pressure difference, and $S_{ram}$ is the area of the cross-section of the ram.

In the case of an asymmetric ram, the external force is determined as follows:

$$F_{ext\_obs} = \Delta P_{eq\_obs} \times S_1$$
$$\text{with } \Delta P_{eq} = P_1 - \frac{S_2}{S_1} P_2$$

where $S_1$ is the cross-section of the ram on the side of the first chamber 14 and $S_2$ is the cross-section of the ram on the side of the second chamber 15.

In other words, the external force $F_{ext}$ is estimated as a linear combination of the pressure difference dynamic component estimated by the first observer 21 and the pressure difference static component estimated by the second observer 22.

The external force acting on the actuator is thus reconstituted in a simple manner by combining the two components originating from the two state observers 21 and 22.

The invention claimed is:

1. A method for controlling an electrohydrostatic actuator, the actuator comprising a ram including a first chamber, a second chamber and a piston situated between the first chamber and the second chamber, a pump capable of injecting fluid into the chambers for controlling a movement of the piston, an electric motor driving the pump, by means of a control unit executing the following steps:
   generating a control signal to control the electric motor,
   estimating the external force acting on the electrohydrostatic actuator,
   determining a correction variable of the control signal depending on the estimated external force, and
   applying the correction variable to the control signal, so as to limit the fluid pressure difference between the chambers of the ram, the estimation of the external force comprising the steps of:
   estimating, by means of at least one state observer, a dynamic component and a static component of an equivalent fluid pressure difference between the first chamber and the second chamber from a rotation speed of the electric motor, a position of the piston and a supply current of the electric motor,
   estimating said external force by means of a post-processing module as a combination of the dynamic component and of the static component of the estimate fluid pressure difference.

2. The method according to claim 1, wherein the estimation of the external force comprises steps of:
   estimating, by means of a first state observer, the dynamic component of the equivalent fluid pressure difference between the first chamber and the second chamber, and a movement speed of the piston, from a rotation speed of the electric motor and a position of the piston, and
   estimating, by means of a second state observer, the static component of the equivalent fluid pressure difference between the first chamber and the second chamber, from the movement speed of the piston estimated by the first observer, the rotation speed of the electric motor and the supply current of the electric motor.

3. The method according to claim 2, wherein the first observer uses the rotation speed of the electric motor and the position of the piston.

4. The method according to claim 2, wherein the second observer uses the rotation speed of the electric motor and the supply current of the electric motor, and a variable combining the movement speed of the piston and the rotation speed of the electric motor.

5. The method according to claim 2, wherein the dynamic component of the equivalent fluid pressure difference is estimated by the first observer from a first mathematical model of the actuator in which the external force acting on the actuator is zero.

6. The method according to claim 5, wherein the first mathematical model is in the form:

$$\begin{pmatrix} \dot{x}_{obs} \\ \dot{v}_{obs} \\ \Delta \dot{P}_{dyn\_obs} \end{pmatrix} = \begin{pmatrix} 0 & 1 & 0 \\ 0 & 0 & \mu \\ 0 & -\gamma & 0 \end{pmatrix} \cdot \begin{pmatrix} x_{obs} \\ v_{obs} \\ \Delta P_{dyn\_obs} \end{pmatrix} + \begin{pmatrix} 0 \\ 0 \\ \lambda \end{pmatrix} \cdot \Omega_{motor} + \begin{pmatrix} k_{11} \\ k_{12} \\ k_{13} \end{pmatrix} \cdot (x_{mes} - x_{obs})$$

where $x_{obs}$ is the estimated position of the piston, $v_{obs}$ is the estimated speed of the piston, $\Delta P_{dyn\_obs}$ is the dynamic component of the estimated equivalent pressure difference, $\Omega_{motor}$ is the rotation speed of the electric motor, $x_{mes}$ is the measured position of the piston, γ, μ, λ are constant parameters of the model and $k_{11}$, $k_{12}$, $k_{13}$ are gains of the first observer adjusting the dynamics and the stability of the first observer.

7. The method according to claim 2, wherein a second static component of the equivalent fluid pressure difference is estimated by the second observer from a second mathematical model of the actuator, in which the static component of the fluid pressure difference is considered to be proportional to the external force.

8. The method according to claim 1, wherein the observer is an observer of the deterministic or stochastic type.

9. The method according to claim 1, wherein the actuator is a flight control surface actuator of an aircraft.

10. A control unit for controlling an electrohydrostatic actuator, the actuator comprising: a ram including a first chamber, a second chamber and a piston situated between the first chamber and the second chamber, a pump capable of injecting fluid into the chambers to control a movement of the piston and an electric motor driving the pump, the control unit being configured to generate a control signal to control the electric motor, estimating the external force acting on the electrohydrostatic actuator, determining a correction variable for the control signal depending on the estimated external force and applying the correction variable to the control signal, so as to limit the fluid pressure difference between the chambers of the ram, the estimation of the external force comprising estimating, by means of at least one state observer, a dynamic component and a static component of an equivalent fluid pressure difference between the first chamber and the second chamber from a rotation speed of the electric motor, a position of the piston and a supply current of the electric motor, estimating said external force by means of a post-processing module as a combination of the dynamic component and of the static component of the estimated fluid pressure difference.

11. An electrohydrostatic actuator and associated control unit, the control unit according to claim 10.

* * * * *